United States Patent
Chen et al.

(10) Patent No.: US 9,363,498 B2
(45) Date of Patent: Jun. 7, 2016

(54) METHOD, SYSTEM AND COMPUTER PROGRAM PRODUCT FOR ADJUSTING A CONVERGENCE PLANE OF A STEREOSCOPIC IMAGE

(71) Applicant: Texas Instruments Incorporated, Dallas, TX (US)

(72) Inventors: Ming-Jun Chen, Austin, TX (US); Do-Kyoung Kwon, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 470 days.

(21) Appl. No.: 13/675,797

(22) Filed: Nov. 13, 2012

(65) Prior Publication Data
US 2013/0120543 A1    May 16, 2013

Related U.S. Application Data

(60) Provisional application No. 61/558,579, filed on Nov. 11, 2011.

(51) Int. Cl.
*H04N 13/04* (2006.01)
*H04N 13/00* (2006.01)

(52) U.S. Cl.
CPC ....... *H04N 13/0018* (2013.01); *H04N 13/0022* (2013.01); *H04N 13/0033* (2013.01)

(58) Field of Classification Search
CPC .......... H04N 13/0018; H04N 13/0022; H04N 13/0033; G09G 2320/0209
See application file for complete search history.

(56) References Cited

U.S. PATENT DOCUMENTS 6,369,831 B1 * 4/2002 Baba et al. ............... 345/635
6,668,080 B1 * 12/2003 Torr et al. ................. 382/173
2011/0292045 A1 * 12/2011 Nakamura et al. ........ 345/419

OTHER PUBLICATIONS

Zaroff, Charles M., et al., "Variation in Stereoacuity: Normative Description, Fixation Disparity, and the Roles of Aging and Gender", Investigative Ophthalmology & Visual Science, Feb. 2003, pp. 891-900, vol. 44 No. 2, Association for Research in Vision and Ophthalmology, Rockville, MD, USA.

Burge, Johannes, et al., "Ordinal Configural Cues Combine with Metric Disparity in Depth Perception", Journal of Vision, Jun. 22, 2005, pp. 534-542, vol. 5 No. 6 Article 5, Association for Research in Vision and Opthalmology, Rockville, MD, USA.

Scharstein, Daniel, et al., "Learning Conditional Random Fields for Stereo", Computer Vision and Pattern Recognition, Jun. 17-22, 2007, pp. 1-8, IEEE, Minneapolis, MN, USA.

Chen, Ming-Jun, et al., "Optimizing 3D Image Display Using the Stereoacuity Function", Image Processing (ICIP) 19th IEEE International Conference on Image Processing, Sep. 30-Oct. 3, 2012, pp. 617-620, Orlando, FL, USA.

(Continued)

*Primary Examiner* — Matthew Sim
(74) *Attorney, Agent, or Firm* — Michael A. Davis, Jr.; Frank D. Cimino

(57) ABSTRACT

First and second views of a stereoscopic image are received. In response to determining that the stereoscopic image has a predominance of foreground features, a convergence plane of the stereoscopic image is adjusted to improve a depth resolution of at least one foreground feature within the stereoscopic image for display to a human by a display device. In response to determining that the stereoscopic image has a predominance of background features, the convergence plane is adjusted to position at least most of the stereoscopic image as background features for display to the human by the display device.

21 Claims, 3 Drawing Sheets

(56) References Cited

OTHER PUBLICATIONS

International Telecommunication Union Radiocommunication Sector, "Methodology for the Subjective Assessment of the Quality of Television Pictures", Recommendation ITU-R BT.500-11, Jun. 2002, pp. 1-48, Geneva, Switzerland.

Wopking, Matthias, "Viewing Comfort with Stereoscopic Pictures: An Experimental Study on the Subjective Effects of Disparity Magnitude and Depth of Focus", Journal of the Society for Information Display, Dec. 1995, pp. 101-103, vol. 3, Issue 3, Society for Information Display, Campbell, CA, USA.

Lambooij, Marc T. M., "Visual Discomfort in Stereoscopic Displays: A Review", Proc. of SPIE—IS&T Electronic Imaging, Stereoscopic Displays and Virtual Reality Systems XIV, vol. 6490, Mar. 5, 2007, pp. 1-13, SPIE, Bellingham, WA, USA.

* cited by examiner

METHOD, SYSTEM AND COMPUTER PROGRAM PRODUCT FOR ADJUSTING A CONVERGENCE PLANE OF A STEREOSCOPIC IMAGE

CROSS-REFERENCE TO RELATED APPLICATION

This application claims priority to U.S. Provisional Patent Application Ser. No. 61/558,579, filed Nov. 11, 2011, entitled A PERCEPTUAL ALGORITHM TO DECIDE THE VERGENCE DISTANCE OF 3D STEREO IMAGES, naming Ming-Jun Chen et al. as inventors, which is hereby fully incorporated herein by reference for all purposes.

BACKGROUND

The disclosures herein relate in general to image processing, and in particular to a method, system and computer program product for adjusting a convergence plane of a stereoscopic image.

In one example, a stereoscopic camera's convergence distance is either: (a) infinity (for a parallel configuration of dual imaging sensors); or (b) a fixed distance (for a toe-in configuration of dual imaging sensors). By comparison, if a human views a stereoscopic image (e.g., within a video sequence of images) with three-dimensional ("3D") effect on a stereoscopic display screen that receives such image from the stereoscopic camera, then the human's natural convergence distance is a distance from the human's eyes to such display screen where the eyes' viewing axes naturally converge. If the stereoscopic camera's convergence distance varies from the human's natural convergence distance, then such variation (e.g., from image-to-image or scene-to-scene) can strain the human's viewing of such image with 3D effect, thereby causing the human's eventual discomfort (e.g., headaches and/or eye muscle pain). Such discomfort is a shortcoming, which discourages the human's viewing of such image with 3D effect.

SUMMARY

First and second views of a stereoscopic image are received. In response to determining that the stereoscopic image has a predominance of foreground features, a convergence plane of the stereoscopic image is adjusted to improve a depth resolution of at least one foreground feature within the stereoscopic image for display to a human by a display device. In response to determining that the stereoscopic image has a predominance of background features, the convergence plane is adjusted to position at least most of the stereoscopic image as background features for display to the human by the display device.

DETAILED DESCRIPTION

Figure 1:
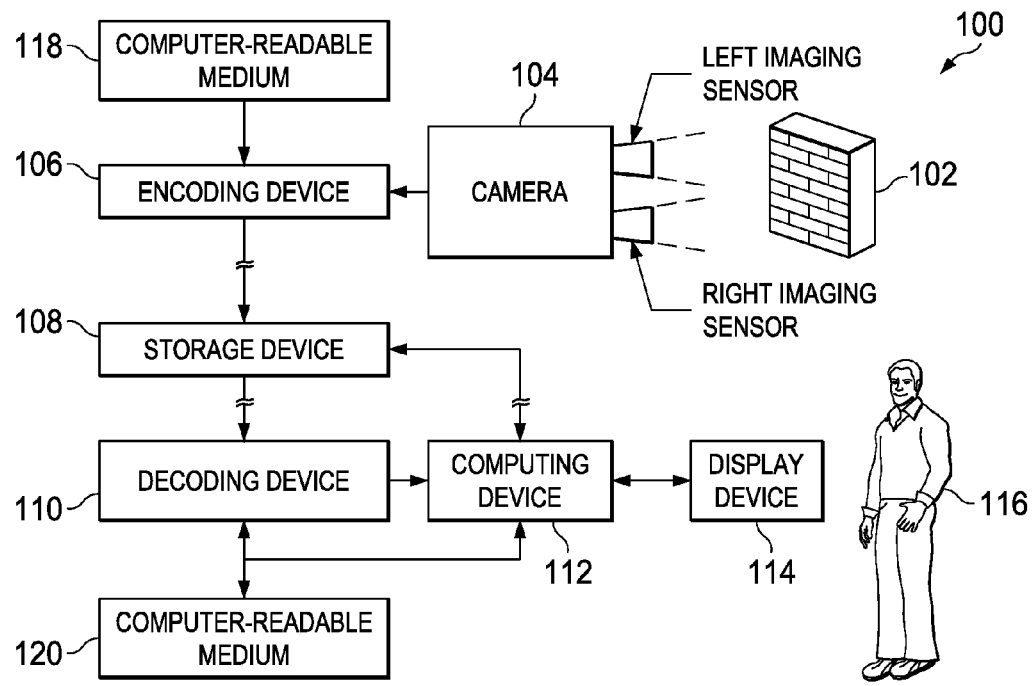
FIG. 1 is a block diagram of an information handling system of the illustrative embodiments.

FIG. 1 is a block diagram of an information handling system (e.g., one or more computers and/or other electronics devices, such as battery-powered mobile smartphones), indicated generally at 100, of the illustrative embodiments. In the example of FIG. 1, a scene (e.g., including a physical object 102 and its surrounding foreground and background) is viewed by a camera 104, which: (a) captures and digitizes images of such views; and (b) outputs a video sequence of such digitized (or "digital") images to an encoding device 106. As shown in the example of FIG. 1, the camera 104 is a stereoscopic camera that includes dual imaging sensors, which are spaced apart from one another, namely: (a) a first imaging sensor for capturing, digitizing and outputting (to the encoding device 106) a first image of a view for a human's left eye; and (b) a second imaging sensor for capturing, digitizing and outputting (to the encoding device 106) a second image of a view for the human's right eye. In another embodiment, the camera 104 is a light detection and ranging ("LIDAR") system.

The encoding device 106: (a) receives the video sequence from the camera 104; (b) encodes the video sequence into a binary logic bit stream; and (c) outputs the bit stream to a storage device 108, which receives and stores the bit stream. A decoding device 110: (a) reads the bit stream from the storage device 108; (b) in response thereto, decodes the bit stream into the video sequence; and (c) outputs the video sequence to a computing device 112. The computing device 112 receives the video sequence from the decoding device 110 (e.g., automatically, or in response to a command from a display device 114, such as a command that a user 116 specifies via a touchscreen of the display device 114).

Also, the computing device 112 receives information from the display device 114, such as: (a) information about the display device 114 (e.g., a type and size of a screen of the display device 114); and/or (b) information about the user 116 (e.g., as specified by the user 116 via a touchscreen of the display device 114), such as preferences of the user 116 and a viewing distance of the user 116 away from the display device 114. In response to such information, the computing device 112 automatically performs various operations for converting the video sequence's digitized images to adjust their respective convergence planes in accordance with such information, as discussed hereinbelow in connection with FIG. 5. For example, the computing device 112 automatically converts a digitized stereoscopic image to adjust its convergence plane by horizontally shifting its left and/or right views.

Optionally, the computing device 112: (a) writes the converted video sequence for storage into the storage device 108; and (b) outputs the converted video sequence to the display device 114 for display to the user 116 (e.g., substantially concurrent with such conversion by the computing device 112 in real-time, or after the computing device 112 subsequently reads the converted video sequence from the storage device 108 in response to a command that the user 116 specifies via a touchscreen of the display device 114). The display device 114: (a) receives the converted video sequence from the computing device 112 (e.g., automatically, or in response to a command that the user 116 specifies via the touchscreen of the display device 114); and (b) in response thereto, displays the converted video sequence (e.g., stereoscopic images of the object 102 and its surrounding foreground and background), which are viewable by the user 116 (e.g., with 3D effect).

The display device 114 is any suitable display device that includes a screen whose optical components enable viewing by the user 116, such as a suitable plasma display screen, liquid crystal display ("LCD") screen, or light emitting diode ("LED") display screen. In one example, the display device 114 displays a stereoscopic image with three-dimensional ("3D") effect for viewing by the user 116 through special glasses that: (a) filter the first image against being seen by the right eye of the user 116; and (b) filter the second image against being seen by the left eye of the user 116. In another example, the display device 114 displays the stereoscopic image with 3D effect for viewing by the user 116 without relying on special glasses.

The encoding device 106 performs its operations in response to instructions of computer-readable programs, which are stored on a computer-readable medium 118 (e.g., hard disk drive, nonvolatile flash memory card, and/or other storage device). Also, the computer-readable medium 118 stores a database of information for operations of the encoding device 106. Similarly, the decoding device 110 and the computing device 112 perform their operations in response to instructions of computer-readable programs, which are stored on a computer-readable medium 120. Also, the computer-readable medium 120 stores a database of information for operations of the decoding device 110 and the computing device 112.

The system 100 includes various electronic circuitry components for performing the system 100 operations, implemented in a suitable combination of software, firmware and hardware, such as one or more digital signal processors ("DSPs"), microprocessors, discrete logic devices, application specific integrated circuits ("ASICs"), and field-programmable gate arrays ("FPGAs"). In one embodiment: (a) a first electronics device includes the camera 104, the encoding device 106, and the computer-readable medium 118, which are housed integrally with one another; and (b) a second electronics device includes the decoding device 110, the computing device 112, the display device 114 and the computer-readable medium 120, which are housed integrally with one another.

In an alternative embodiment: (a) the encoding device 106 outputs the bit stream directly to the decoding device 110 via a network, such as a mobile (e.g., cellular) telephone network, a landline telephone network, and/or a computer network (e.g., Ethernet, Internet or intranet); and (b) accordingly, the decoding device 110 receives and processes the bit stream directly from the encoding device 106 substantially in real-time. In such alternative embodiment, the storage device 108 either: (a) concurrently receives (in parallel with the decoding device 110) and stores the bit stream from the encoding device 106; or (b) is absent from the system 100.

Figure 2:
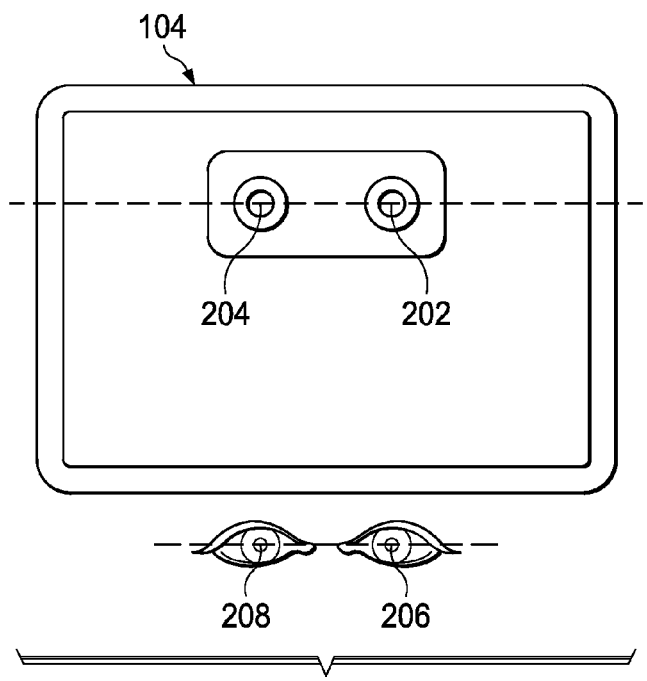
FIG. 2 is a diagram of an example orientation of dual imaging sensors of a camera of FIG. 1.

FIG. 2 is a diagram of an example orientation of the dual imaging sensors 202 and 204 (of the camera 104), in which a line between the sensors 202 and 204 is substantially parallel to a line between eyes 206 and 208 of the user 116. In this example, while the sensors 202 and 204 have such orientation, the camera 104 captures and digitizes images with a landscape aspect ratio.

Figure 3:
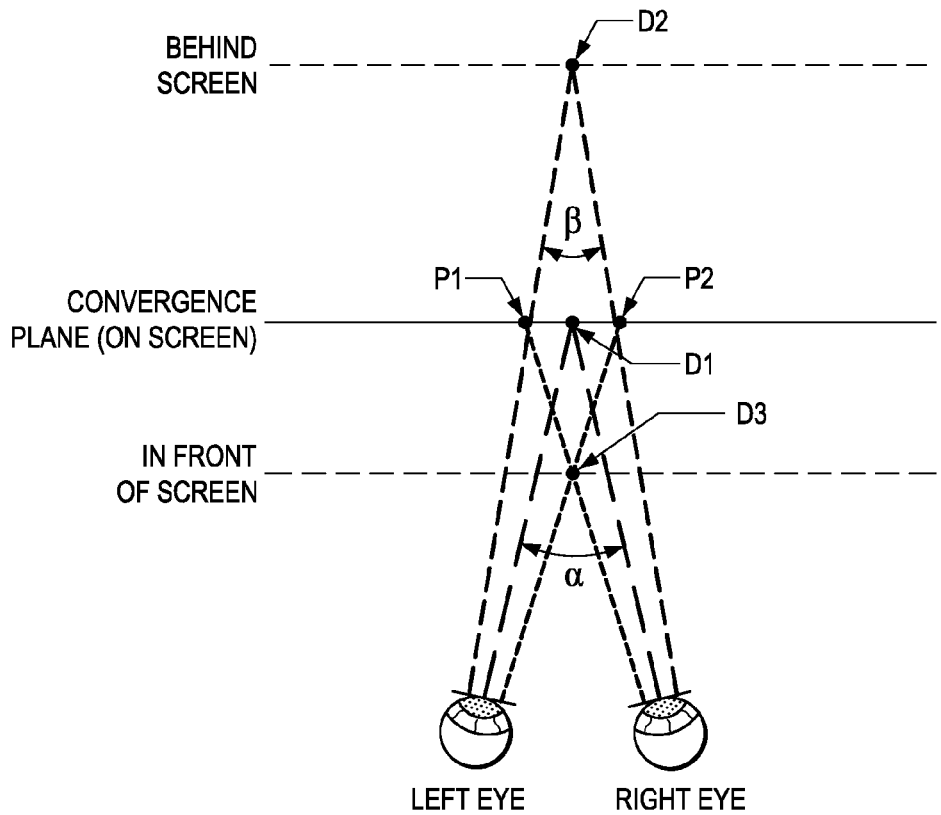
FIG. 3 is a diagram of viewing axes of a human's left and right eyes.

FIG. 3 is a diagram of viewing axes of the left and right eyes of the user 116. In the example of FIG. 3, a stereoscopic image is displayable by the display device 114 on a screen (which is a convergence plane where viewing axes of the left and right eyes naturally converge to intersect). The user 116 experiences the 3D effect by viewing the stereoscopic image on the display device 114, so that various features (e.g., objects) appear on the screen (e.g., at a point D1), behind the screen (e.g., at a point D2), and/or in front of the screen (e.g., at a point D3).

Within the stereoscopic image, a feature's disparity is a horizontal shift between: (a) such feature's location within the first image; and (b) such feature's corresponding location within the second image. A limit of such disparity is dependent on the camera 104. For example, if a feature (within the stereoscopic image) is centered at the point D1 within the first image, and likewise centered at the point D1 within the second image, then: (a) such feature's disparity=D1−D1=0; and (b) the user 116 will perceive the feature to appear at the point D1 on the screen, which is a natural convergence distance away from the left and right eyes.

By comparison, if the feature is centered at a point P1 within the first image, and centered at a point P2 within the second image, then: (a) such feature's disparity=P2−P1 will be positive; and (b) the user 116 will perceive the feature to appear at the point D2 behind the screen, which is greater than the natural convergence distance away from the left and right eyes. Conversely, if the feature is centered at the point P2 within the first image, and centered at the point P1 within the second image, then: (a) such feature's disparity=P1−P2 will be negative; and (b) the user 116 will perceive the feature to appear at the point D3 in front of the screen, which is less than the natural convergence distance away from the left and right eyes. The amount of the feature's disparity (e.g., horizontal shift of the feature from P1 within the first image to P2 within the second image) is measurable as a number of pixels, so that: (a) positive disparity is represented as a positive number; and (b) negative disparity is represented as a negative number.

Figure 4:
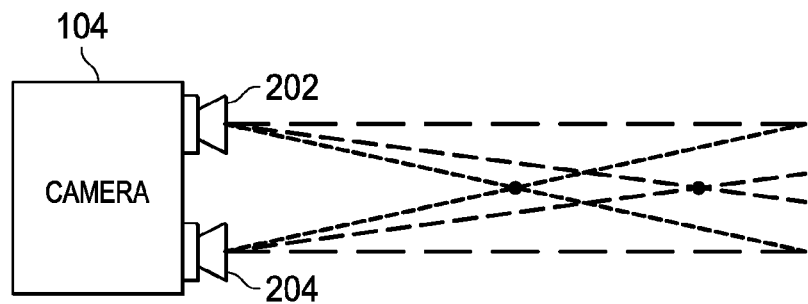
FIG. 4 is a diagram of a parallel configuration of dual imaging sensors of the camera of FIG. 1.

FIG. 4 is a diagram of a parallel configuration of the dual imaging sensors 202 and 204 (of the camera 104). As shown in FIG. 4, a parallel configuration of the dual imaging sensors 202 and 204 causes crossed disparity values, which limits a range of depths that can be displayed on the screen of the display device 114. Accordingly, the computing device 112 automatically performs various operations for converting the video sequence's digitized images to adjust their respective convergence planes, so that the computing device 112 thereby uncrosses and shifts the disparity values to fit within a range that is comfortable for the user 116 to view with 3D effect on the screen of the display device 114 ("zone of comfortable viewing"), as discussed hereinbelow in connection with FIG. 5. The zone of comfortable viewing is variable. For example, referring also to FIG. 3: (a) in some cases, $|\alpha-\beta| \leq 1°$ within the zone of comfortable viewing; and (b) in other cases, $|\alpha-\beta| \leq 0.5°$ within the zone of comfortable viewing.

Figure 5:
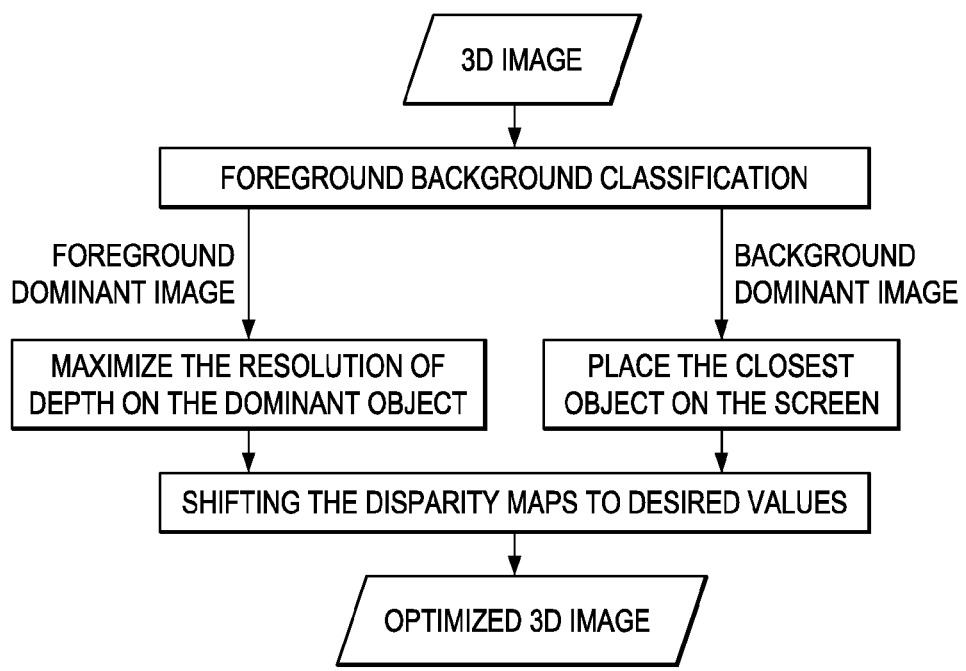
FIG. 5 is a flowchart of various operations that a computing device of FIG. 1 automatically performs for adjusting a convergence plane of a stereoscopic image.

FIG. 5 is a flowchart of the various operations that the computing device 112 automatically performs for adjusting a convergence plane of a stereoscopic image ("3D image"). In response to the 3D image, the computing device 112 generates a depth map ("image depth map" or "disparity map") that assigns respective disparity values to pixels of the 3D image (e.g., in response to estimated or measured depths of such pixels), so that a pixel's disparity value is information about (e.g., indicative of) such pixel's depth and vice versa. Optionally, in response to the database of information (e.g., training information) from the computer-readable medium 120, the computing device 112: (a) identifies (e.g., detects and classifies) various low level features (e.g., colors, edges, textures, focus/blur, sizes, gradients, and positions) and high level features (e.g., faces, bodies, sky and foliage) within the 3D image, such as by performing a mean shift clustering operation to segment the 3D image into regions; and (b) computes disparities of such features (between the first image and its associated second image). For example, in a stereo pair of images (e.g., a stereoscopic image), a feature's depth is proportional to a disparity between such feature's corresponding left and right image pixels, so that such disparity is information about such depth and vice versa.

In response to the 3D image, the computing device 112 determines whether to classify the 3D image as having: (a) a predominance of foreground features ("foreground dominant" image); or (b) a predominance of background features ("background dominant" image). After classifying the 3D image in that manner, the computing device 112 adjusts the 3D image's convergence plane in accordance with a determination (by the computing device 112) of the viewer's preferences.

For example, in response to classifying the 3D image as being "foreground dominant," the computing device 112: (a) identifies at least one dominant foreground feature (e.g., foreground object) within the 3D image; (b) shifts the 3D image to adjust its convergence plane for improving perceptual 3D resolution of such feature's depth, according to a depth resolution function ("DRF") that models a stereoacuity function; (c) updates maps of the 3D image's disparity values accordingly; and (d) in response thereto, generates the converted 3D image having such adjusted convergence plane. In response to classifying the 3D image as being "background dominant," the computing device 112: (a) identifies a nearest feature (e.g., object) within the 3D image; (b) shifts the 3D image to adjust its convergence plane for making such feature appear on (or, alternatively, slightly behind) the screen of the display device 114; (c) updates maps of the 3D image's disparity values accordingly; and (d) in response thereto, generates the converted 3D image having such adjusted convergence plane.

Human depth perception is affected by a combination of monocular cues and binocular cues. Conflicts between such cues may create viewing discomfort or ambiguity in such depth perception. By evaluating a composition of the 3D image, the computing device 112 generates the converted 3D images to reduce such conflicts and thereby helps to enhance an overall 3D viewing experience of the user 116.

While scanning a real-world 3D scene, the focal plane of the user 116 accommodates to obtain better depth resolutions. By comparison, as discussed hereinabove in connection with FIG. 3, viewing axes of the left and right eyes naturally converge to intersect on the screen of the display device 114. Accordingly, while viewing 3D images on the screen of the display device 114, the focal plane of the user 116 is relatively fixed on the screen of the display device 114 (yet the convergence plane may vary), so a high depth resolution is available primarily near the focal plane (according to the modeled stereoacuity function).

In response to classifying a 3D image as being "background dominant," the computing device 112 adjusts the 3D image's convergence plane, so that at least most of the 3D image has a relatively deep depth within the 3D image for appearing behind the screen when the 3D image is displayed by the display device 114. By comparison, in response to classifying the 3D image as being "foreground dominant," the computing device 112 adjusts the 3D image's convergence plane, so that at least one dominant foreground feature has a relatively shallow depth within the 3D image for appearing closer to the user 116 when the 3D image is displayed by the display device 114. For classifying the 3D image as being either "background dominant" or "foreground dominant," the computing device 112 computes: (a) a skew of a distribution of the 3D image's respective disparity values ("skewness"); and (b) in some cases, relative dominant depth ("RDD") of the 3D image's respective disparity values.

The computing device 112 computes the 3D image's skewness as:

$$\text{skewness} = \frac{\frac{1}{n}\sum_{i=1}^{n}(d_i - \bar{d})^3}{\left(\frac{1}{n}\sum_{i=1}^{n}(d_i - \bar{d})^2\right)^{\frac{3}{2}}}$$

where $d_i$ is a pixel's disparity value, and $\bar{d}$ is the 3D image's mean disparity. If the 3D image's skewness >1, then the computing device 112 classifies the 3D image as being "foreground dominant." If the 3D image's skewness <−1, then the computing device 112 classifies the 3D image as being "background dominant."

If the 3D image's |skewness|≤1, then the computing device 112 computes the 3D image's RDD as:

$$RDD = \frac{(\text{dominant disparity} - \text{minimum disparity})}{(\text{maximum disparity} - \text{minimum disparity})}.$$

The dominant disparity is a mode of a given disparity set. In one example: (a) $\xi$=0.25; (b) if |RDD|<$\xi$, then the computing device 112 classifies the 3D image as being "foreground dominant"; and (c) if |RDD|>$\xi$, then the computing device 112 classifies the 3D image as being "background dominant."

For perceiving different depths between features, a human's vision system relies upon at least a minimum degree of variation in disparity, which is called a stereo threshold. In one example, lower stereo thresholds were generally obtained at a zero pedestal disparity, and higher stereo thresholds were generally obtained at increasingly crossed or uncrossed pedestal disparity. Also, a human's perception of the 3D image may be affected by other content-related factors, such as object contours and composition of the 3D image.

The stereoacuity function provides the stereo threshold at different disparities. In viewing a 3D image on the screen of the display device 114, a human's stereoacuity is especially sensitive at the focal plane (which is relatively fixed on the screen of the display device 114), so the human's vision system achieves a higher depth resolution for features whose disparity is near zero. In one study of a female's stereoacuity, her stereo vision was normal, and her minimal threshold disparity was 24 arcsec at zero disparity.

For example, if two objects are 50 arcsec apart in depth, and if one of those objects has a zero disparity value, then such female would be expected to see the two objects at different depth planes from one another. By comparison, if one of those objects has a disparity value larger than 20 arcmin, then such female would be expected to see the two objects at approximately the same depth plane as one another. Accordingly, if the computing device 112 adjusts the 3D image's convergence plane to make both of those objects have disparities near zero (so that such objects appear on or near the screen of the display device 114), then such female would be expected to see the two objects with improved depth resolution.

In response to classifying the 3D image as being "foreground dominant," the computing device 112 computes the 3D image's DRF by approximating a negative of the stereoacuity function as 1−s(d) in terms of pixel disparity d. The DRF is a zero mean Gaussian function that: (a) quantifies a human's ability to visually resolve depths of features within the 3D image; and (b) has the following form to weight the pixel disparity d values near zero.

$$f(\mu, \sigma^2) = \frac{1}{\sigma\sqrt{2\pi}} \exp\left\{-\frac{1}{2}\left(\frac{x-\mu}{\sigma}\right)^2\right\}$$

In accordance with the following equation, the computing device 112 determines a shift value i that achieves a maximum opt shift value:

$$\text{opt shift} = \underset{-255 < i 255}{\text{argmax}} DRF \cdot Hist(i)$$

where the computing device 112 computes DRF in response to $\mu=0$ and $\sigma=20$ arcmin (which is preselected as a parameter for improving fit to the modeled stereoacuity function, based on a viewing environment, such as screen size, screen resolution, and viewing distance). Accordingly, Hist(0) is a histogram of the various disparity values of the unconverted 3D image without shifting, and Hist(i) is a histogram of the various disparity values of the converted 3D image that has been horizontally shifted by i pixels relative to the unconverted 3D image.

In a first example, the computing device 112 horizontally shifts: (a) the left view by i/2 pixels in a left direction (if i is positive) or a right direction (if i is negative); and (b) the right view by i/2 pixels in a right direction (if i is positive) or a left direction (if i is negative). In a second example, the computing device 112 horizontally shifts: (a) only the left view by i pixels in a left direction (if i is positive) or a right direction (if i is negative); or (b) only the right view by i pixels in a right direction (if i is positive) or a left direction (if i is negative). In that manner, the computing device 112 improves the human's perceived depth resolution in viewing of the converted 3D image on the display device 114.

In horizontally shifting the left view and/or the right view, additional image information (e.g., beyond edges of such views) might be unavailable to the computing device 112. In response to such unavailability, the computing device 112 automatically: (a) crops the shifted view(s) to include only available information, while preserving the image's original aspect ratio and the adjusted convergence plane; and (b) optionally, magnifies the left and right views to restore their original dimensions that existed before such cropping.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by an information handling system for adjusting a convergence plane of a stereoscopic image, the method comprising:
    receiving first and second views of the stereoscopic image;
    in response to the stereoscopic image, generating a disparity map that assigns respective disparity values to pixels of the stereoscopic image, wherein the respective disparity values are indicative of respective depths of the pixels;
    determining whether the stereoscopic image has a predominance of foreground features versus a predominance of background features;
    in response to determining that the stereoscopic image has the predominance of foreground features, adjusting the convergence plane by horizontally shifting at least one of the first and second views to improve a depth resolution of at least one foreground feature within the stereoscopic image for display to a human by a display device; and
    in response to determining that the stereoscopic image has the predominance of background features, adjusting the convergence plane by horizontally shifting at least one of the first and second views to position at least most of the stereoscopic image as background features for display to the human by the display device;
    wherein determining whether the stereoscopic image has the predominance of foreground features versus the predominance of background features includes: computing a skew of a distribution of the respective disparity values in response to $$\text{skewness} = \frac{\frac{1}{n}\sum_{i=1}^{n}(d_i - \bar{d})^3}{\left(\frac{1}{n}\sum_{i=1}^{n}(d_i - \bar{d})^2\right)^{\frac{3}{2}}}$$

wherein $d_i$ is an $i^{th}$ one of the respective disparity values, and $\bar{d}$ is an average disparity; and, in response to the computed skew, determining whether the stereoscopic image has the predominance of foreground features versus the predominance of background features.

2. The method of claim 1, wherein determining whether the stereoscopic image has the predominance of foreground features versus the predominance of background features includes: in response to a relative dominant depth of the respective disparity values, determining whether the stereoscopic image has the predominance of foreground features versus the predominance of background features.

3. The method of claim 1, and comprising: updating the disparity map in response to adjusting the convergence plane.

4. The method of claim 1, wherein adjusting the convergence plane to improve the depth resolution includes: adjusting the convergence plane to improve the depth resolution according to a model of stereoacuity.

5. The method of claim 4, wherein the model of stereoacuity includes a zero mean Gaussian function that quantifies ability of a human to visually resolve depths of features within the stereoscopic image.

6. The method of claim 1, wherein adjusting the convergence plane to improve the depth resolution includes: adjusting the convergence plane to position the at least one foreground feature at a relatively shallow depth within the stereoscopic image.

7. The method of claim 1, wherein adjusting the convergence plane to position at least most of the stereoscopic image as background features includes: adjusting the convergence plane to position at least most of the stereoscopic image at a relatively deep depth within the stereoscopic image.

8. A system for adjusting a convergence plane of a stereoscopic image, the system comprising:
a combination of electronic circuitry components for: receiving first and second views of the stereoscopic image; in response to the stereoscopic image, generating a disparity map that assigns respective disparity values to pixels of the stereoscopic image, wherein the respective disparity values are indicative of respective depths of the pixels; determining whether the stereoscopic image has a predominance of foreground features versus a predominance of background features; in response to determining that the stereoscopic image has the predominance of foreground features, adjusting the convergence plane by horizontally shifting at least one of the first and second views to improve a depth resolution of at least one foreground feature within the stereoscopic image for display to a human by a display device; and, in response to determining that the stereoscopic image has the predominance of background features, adjusting the convergence plane by horizontally shifting at least one of the first and second views to position at least most of the stereoscopic image as background features for display to the human by the display device;
wherein determining whether the stereoscopic image has the predominance of foreground features versus the predominance of background features includes: computing a skew of a distribution of the respective disparity values in response to $$\text{skewness} = \frac{\frac{1}{n}\sum_{i=1}^{n}(d_i - \bar{d})^3}{\left(\frac{1}{n}\sum_{i=1}^{n}(d_i - \bar{d})^2\right)^{\frac{3}{2}}}$$

wherein $d_i$ is an $i^{th}$ one of the respective disparity values, and d is an average disparity; and, in response to the computed skew, determining whether the stereoscopic image has the predominance of foreground features versus the predominance of background features.

9. The system of claim 8, wherein determining whether the stereoscopic image has the predominance of foreground features versus the predominance of background features includes: in response to a relative dominant depth of the respective disparity values, determining whether the stereoscopic image has the predominance of foreground features versus the predominance of background features.

10. The system of claim 8, wherein the combination of electronic circuitry components is for: updating the disparity map in response to adjusting the convergence plane.

11. The system of claim 8, wherein adjusting the convergence plane to improve the depth resolution includes: adjusting the convergence plane to improve the depth resolution according to a model of stereoacuity.

12. The system of claim 11, wherein the model of stereoacuity includes a zero mean Gaussian function that quantifies ability of a human to visually resolve depths of features within the stereoscopic image.

13. The system of claim 8, wherein adjusting the convergence plane to improve the depth resolution includes: adjusting the convergence plane to position the at least one foreground feature at a relatively shallow depth within the stereoscopic image.

14. The system of claim 8, wherein adjusting the convergence plane to position at least most of the stereoscopic image as background features includes: adjusting the convergence plane to position at least most of the stereoscopic image at a relatively deep depth within the stereoscopic image.

15. A computer program product for adjusting a convergence plane of a stereoscopic image, the computer program product comprising:
a non-transitory computer-readable storage medium; and
a computer-readable program stored on the non-transitory computer-readable storage medium, wherein the computer-readable program is processable by an information handling system for causing the information handling system to perform operations including: receiving first and second views of the stereoscopic image; in response to the stereoscopic image, generating a disparity map that assigns respective disparity values to pixels of the stereoscopic image, wherein the respective disparity values are indicative of respective depths of the pixels; determining whether the stereoscopic image has a predominance of foreground features versus a predominance of background features; in response to determining that the stereoscopic image has the predominance of foreground features, adjusting the convergence plane by horizontally shifting at least one of the first and second views to improve a depth resolution of at least one foreground feature within the stereoscopic image for display to a human by a display device; and, in response to determining that the stereoscopic image has the predominance of background features, adjusting the convergence plane by horizontally shifting at least one of the first and second views to position at least most of the stereoscopic image as background features for display to the human by the display device;

wherein determining whether the stereoscopic image has the predominance of foreground features versus the predominance of background features includes: computing a skew of a distribution of the respective disparity values in response to $$\text{skewness} = \frac{\frac{1}{n}\sum_{i=1}^{n}(d_i - \bar{d})^3}{\left(\frac{1}{n}\sum_{i=1}^{n}(d_i - \bar{d})^2\right)^{\frac{3}{2}}}$$

wherein $d_i$ is an $i^{th}$ one of the respective disparity values, and d is an average disparity; and, in response to the computed skew, determining whether the stereoscopic image has the predominance of foreground features versus the predominance of background features.

16. The computer program product of claim 15, wherein determining whether the stereoscopic image has the predominance of foreground features versus the predominance of background features includes: in response to a relative dominant depth of the respective disparity values, determining whether the stereoscopic image has the predominance of foreground features versus the predominance of background features.

17. The computer program product of claim 15, wherein the operations include: updating the disparity map in response to adjusting the convergence plane.

18. The computer program product of claim 15, wherein adjusting the convergence plane to improve the depth resolution includes: adjusting the convergence plane to improve the depth resolution according to a model of stereoacuity.

19. The computer program product of claim 18, wherein the model of stereoacuity includes a zero mean Gaussian function that quantifies ability of a human to visually resolve depths of features within the stereoscopic image.

20. The computer program product of claim 15, wherein adjusting the convergence plane to improve the depth resolution includes: adjusting the convergence plane to position the at least one foreground feature at a relatively shallow depth within the stereoscopic image.

21. The computer program product of claim 15, wherein adjusting the convergence plane to position at least most of the stereoscopic image as background features includes: adjusting the convergence plane to position at least most of the stereoscopic image at a relatively deep depth within the stereoscopic image.

* * * * *